United States Patent
Lee et al.

(10) Patent No.: US 9,617,429 B2
(45) Date of Patent: Apr. 11, 2017

(54) AIR ELECTRODE, LITHIUM AIR BATTERY COMPRISING THE AIR ELECTRODE, AND METHOD OF MANUFACTURING THE AIR ELECTRODE

(71) Applicant: Samsung Electronics Co., Ltd., Suwon-si, Gyeonggi-do (KR)

(72) Inventors: Hyunpyo Lee, Seoul (KR); Dongjoon Lee, Suwon-si (KR); Dongmin Im, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 162 days.

(21) Appl. No.: 14/689,524

(22) Filed: Apr. 17, 2015

(65) Prior Publication Data
US 2016/0013487 A1    Jan. 14, 2016

(30) Foreign Application Priority Data
Jul. 11, 2014   (KR) .......................... 10-2014-0087484

(51) Int. Cl.
| | |
|---|---|
| *H01M 4/583* | (2010.01) |
| *H01M 12/06* | (2006.01) |
| *H01M 12/02* | (2006.01) |
| *C09C 1/56* | (2006.01) |
| *H01M 4/86* | (2006.01) |
| *H01M 4/96* | (2006.01) |
| *H01M 12/08* | (2006.01) |

(52) U.S. Cl.
CPC ............ *C09C 1/56* (2013.01); *H01M 4/8663* (2013.01); *H01M 4/96* (2013.01); *H01M 12/08* (2013.01); *H01M 2300/0025* (2013.01); *H01M 2300/0045* (2013.01); *H01M 2300/0082* (2013.01); *Y02E 60/128* (2013.01); *Y02P 70/54* (2015.11)

(58) Field of Classification Search
CPC ......... H01M 12/08; H01M 2300/0025; H01M 2300/0045; H01M 2300/0082; H01M 4/8663; C09C 1/56; Y02E 60/122; Y02E 60/50
See application file for complete search history.

(56) References Cited

U.S. PATENT DOCUMENTS

| | | | |
|---|---|---|---|
| 8,580,431 B2 | 11/2013 | Roev et al. | |
| 2009/0087721 A1* | 4/2009 | Yoshida ............. | H01M 4/9083 429/422 |
| 2013/0216922 A1 | 8/2013 | Zheng et al. | |
| 2016/0006010 A1* | 1/2016 | Suguro ................ | H01M 4/62 429/126 |

FOREIGN PATENT DOCUMENTS

| | | |
|---|---|---|
| JP | 2003-522410 A | 7/2003 |
| JP | 2004-265638 A | 9/2004 |

(Continued)

*Primary Examiner* — Carlos Barcena
(74) *Attorney, Agent, or Firm* — Cantor Colburn LLP

(57) ABSTRACT

An air electrode including: a carbonaceous material having an electrolyte-philic ion-dissociative functional group coated on a surface thereof; a lithium salt; and an electrolyte, wherein the carbonaceous material has a specific surface area of about 500 $m^2/g$ or greater, and the electrolyte-philic ion-dissociative functional group is electrochemically stable in a voltage range of about 1.5 V to about 4.5 V with respect to lithium.

19 Claims, 11 Drawing Sheets

(56) References Cited

FOREIGN PATENT DOCUMENTS

| | | |
|---|---:|---:|
| JP | 5468416 B2 | 2/2014 |
| KR | 1020050012747 A | 2/2005 |
| KR | 1020130014650 A | 2/2013 |
| KR | 10-1262666 B1 | 5/2013 |
| KR | 10-1282676 B1 | 7/2013 |
| KR | 10-1325555 B1 | 11/2013 |
| KR | 10-1352794 B1 | 1/2014 |
| WO | 03/100889 A1 | 12/2003 |

\* cited by examiner

AIR ELECTRODE, LITHIUM AIR BATTERY COMPRISING THE AIR ELECTRODE, AND METHOD OF MANUFACTURING THE AIR ELECTRODE

CROSS REFERENCE TO RELATED APPLICATION

This application claims priority to and the benefit of Korean Patent Application No. 10-2014-0087484, filed on Jul. 11, 2014, in the Korean Intellectual Property Office, and all the benefits accruing therefrom under 35 U.S.C. §119, the content of which is incorporated herein in its entirety by reference.

BACKGROUND

1. Field

The present disclosure relates to an air electrode, a lithium air battery including the same, and methods of manufacturing the air electrode.

2. Description of the Related Art

A lithium air battery includes a negative electrode that allows intercalation and deintercalation of lithium ions, an air electrode that oxidizes and reduces oxygen present in the air, and a separator disposed between the air electrode and the negative electrode.

Due to using lithium in the negative electrode and air from the atmosphere as an air electrode active material, the lithium air battery may have a high capacity. A lithium air battery has a high theoretical energy density per unit weight of 3,500 Wh/kg or greater, which is about ten times higher than that of lithium ion batteries. Nonetheless the remains a need for improved lithium air battery materials.

SUMMARY

Provided is an air electrode including surface-modified carbonaceous material.

Provided is a lithium air battery including the air electrode.

Provided are methods of manufacturing the air electrode.

Additional aspects will be set forth in part in the description which follows and, in part, will be apparent from the description.

According to an aspect, an air electrode includes: a carbonaceous material having an electrolyte-philic ion-dissociative functional group disposed on a surface thereof; a lithium salt; and an electrolyte, wherein the carbonaceous material has a specific surface area of about 500 square meters per gram ($m^2/g$) or greater, and the electrolyte-philic ion-dissociative functional group is electrochemically stable in a voltage range of about 1.5 volts (V) to about 4.5 V with respect to lithium.

According to another aspect, a lithium air battery includes: a negative electrode that allows incorporation and deincorporation of lithium ions; the air electrode; and a separator disposed between the negative electrode and the air electrode.

According to another aspect, a method of manufacturing an air electrode includes: contacting a starting carbonaceous material with a proton-dissociative functional group-containing compound to obtain a carbonaceous material including a plurality of proton-dissociative functional groups; and treating the carbonaceous material including the plurality of proton-dissociative functional groups with a neutralizing agent to obtain a carbonaceous material having an ion-dissociative functional group represented by one of Formula 1 to 3:

$$—R_1—SO_3M \quad \text{Formula 1}$$

$$—R_2—SO_2—NM_2 \quad \text{Formula 2}$$

$$—R_3—SO_2—N(M)\text{-}SO_2—R_4 \quad \text{Formula 3}$$

wherein, in Formulas 1, 2, and 3,

M is lithium, $R_1$, $R_2$, and $R_3$ are each independently a covalent bond, a halogen-substituted or unsubstituted C1-C10 alkylene group, a halogen-substituted or unsubstituted C6-C20 arylene group, or a halogen-substituted or unsubstituted C3-C20 heteroarylene group, and $R_4$ is a halogen-substituted or unsubstituted C1-C10 alkyl group, a halogen-substituted or unsubstituted C6-C20 aryl group, or a halogen-substituted or unsubstituted C3-C20 heteroaryl group.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
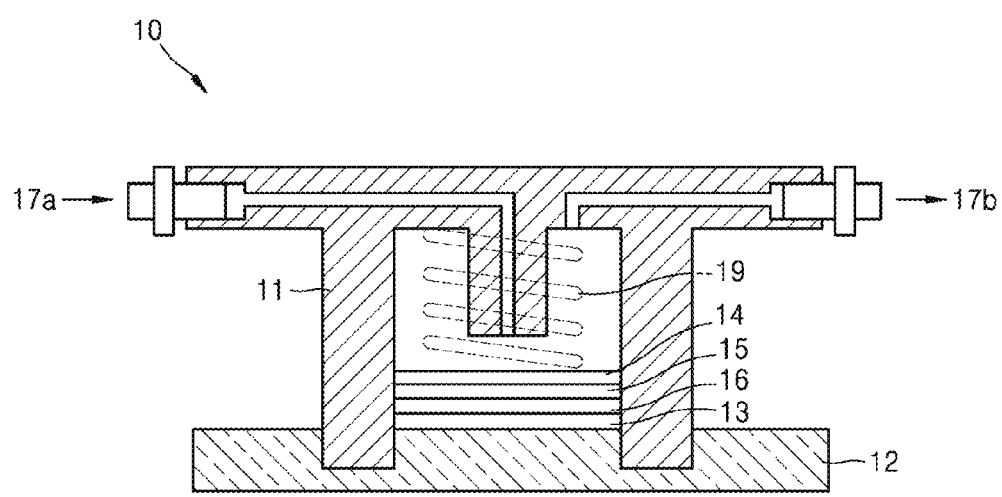
FIG. 1 is a schematic view illustrating an embodiment of a structure of a lithium air battery.

Reference will now be made in detail to embodiments of an air electrode, a lithium air battery including the air electrode, and a method of manufacturing the air electrode, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A carbonaceous material used in an air electrode of a lithium air battery may have a non-polar surface with a high specific surface area. An electrolyte that transfers lithium ions to the air electrode may comprise a polar polymer or an ionic liquid. Due to a difference in polarity, the carbonaceous material and the electrolyte may have a high surface tension. Consequently, it may be difficult to sufficiently impregnate the carbonaceous material with the electrolyte so that the electrolyte is uniformly dispersed therein, thus failing to fully utilize the specific surface area of the carbonaceous material. Therefore, there remains a need for a method to improve a contacting area between the surface of the carbonaceous material and the electrolyte.

According to an embodiment of the present disclosure, an air electrode includes: a carbonaceous material having an electrolyte-philic ion-dissociative functional group disposed, e.g., coated on, a surface thereof; a lithium salt; and an electrolyte, wherein the carbonaceous material has a specific surface area of about 500 square meters per gram ($m^2/g$) or greater, and the electrolyte-philic ion-dissociative functional group is electrochemically stable in a voltage range of about 1.5 volts (V) to about 4.5 V with respect to lithium.

A lithium air battery may comprise either an aqueous electrolyte or a nonaqueous electrolyte. A reaction mechanism of a lithium air battery using a nonaqueous electrolyte can be as in Reaction Scheme 1.

Reaction Scheme 1

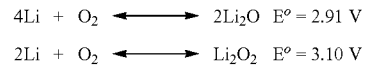

During discharge, and while not wanting to be bound by theory, it is understood that lithium from the negative electrode reacts with oxygen from the air electrode, forming lithium oxide ($Li_2O_2$) as a result of reduction of the oxygen from the air electrode in an "oxygen reduction reaction" (ORR). Meanwhile, during charge, the lithium oxide ($Li_2O_2$) is reduced, generating oxygen in an "oxygen evolution reaction" (OER). The lithium oxide ($Li_2O_2$) may precipitate in pores of the air electrode during discharge. The capacity of a lithium air battery may be greater when a surface area of the electrolyte that contacts the air electrode is increased.

As used herein, the term "electrolyte-philic" of an electrolyte-philic ion-dissociative functional group means that the ion-dissociative functional group has greater affinity to the electrolyte than a surface of a starting carbonaceous material, or alternatively means that the ion-dissociative functional group provides for a reduced interfacial energy or interfacial tension with respect to the electrolyte. The term "electrolyte-philic" may be construed in various ways depending on a type of the electrolyte, for example, as being hydrophilic for an aqueous electrolyte, or as being lyophilic for a non-aqueous liquid electrolyte.

Figure 7:
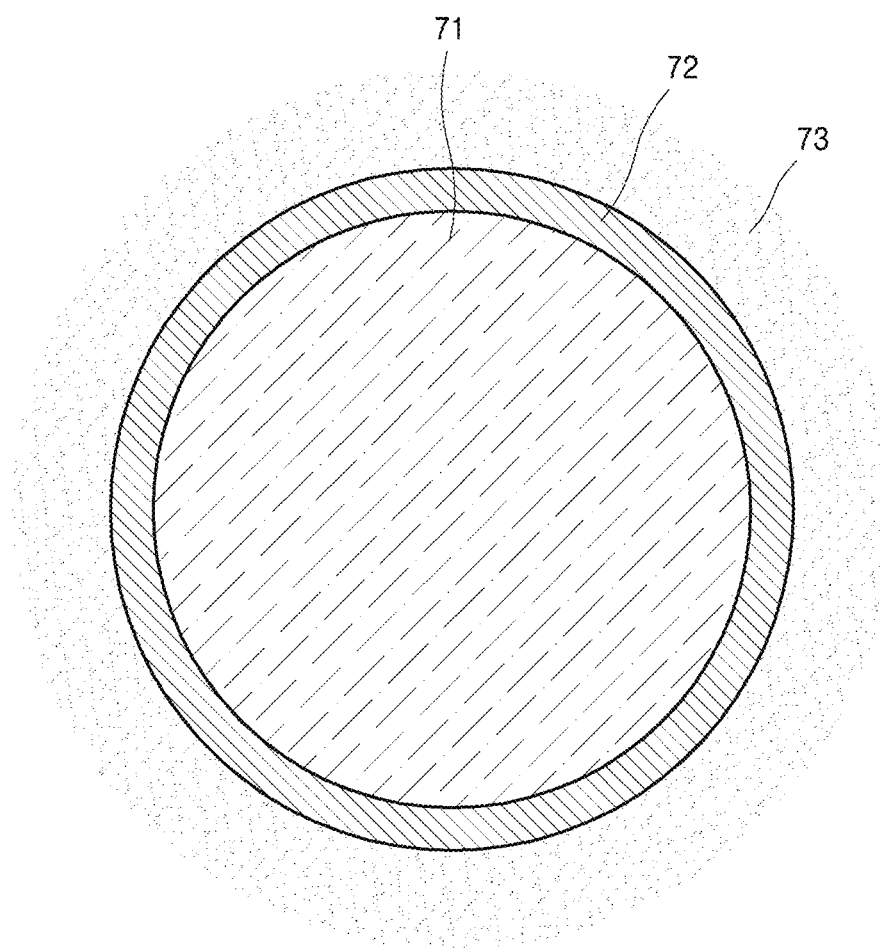
FIG. 7 is a schematic view of an embodiment of a structure of a carbonaceous material.

When the electrolyte-philic ion-dissociative functional group is "coated" on a surface of the carbonaceous material, a plurality of the electrolyte-philic ion-dissociative functional groups may be disposed on a part or on an entirety of a surface of the carbonaceous material. The electrolyte-philic ion-dissociative functional groups may be disposed on the surface of the carbonaceous material by the coating of the electrolyte-philic ion-dissociative functional group. For example, the surface of the carbonaceous material may be contacted with the electrolyte-philic ion-dissociative functional group to provide a coated carbonaceous material, as illustrated in FIG. 7. In FIG. 7, shown is a particle of the carbonaceous material 71, a coating comprising ion-dissociative functional group 72, and an electrolyte 73.

As used herein, the terms "carbonaceous material" refers to a carbonaceous material having a surface coated with an electrolyte-philic ion-dissociative functional group, unless stated otherwise.

Due to the coating or treatment of the surface of the carbonaceous material of the air electrode with the electrolyte-philic ion-dissociative functional group, the surface of the carbonaceous material may be easily impregnated with the electrolyte. Accordingly, an effective area of the carbonaceous material that contacts the electrolyte may be increased. Consequently, the air electrode including the carbonaceous material may have a high lithium ion conductivity, and a lithium air battery including the air electrode may have an increased specific capacity.

When the carbonaceous material has a specific surface area of less than 500 m$^2$/g, sp$^3$ orbitals formed by binding of the electrolyte-philic ion-dissociative functional group on the surface of the carbonaceous material may cause defects that hinder electron transfer on the surface of the carbonaceous material. The specific surface area of the carbonaceous material may be about 500 m$^2$/g to about 2500 m$^2$/g, about 600 m$^2$/g to about 2300 m$^2$/g, or about 700 m$^2$/g to about 2100 m$^2$/g.

Since the electrolyte-philic ion-dissociative functional group is electrochemically stable in a voltage range of about 1.5 V to about 4.5 V with respect to lithium, the electrolyte may be effectively impregnated in an operational voltage range of a lithium air battery. For example, the electrolyte-philic ion-dissociative functional group may be electrochemically stable in a voltage range of about 1.7 V to about 4.3 V with respect to lithium. For example, the electrolyte-philic ion-dissociative functional group may be electrochemically stable in a voltage range of about 1.7 V to about 4.2 V with respect to lithium. For example, a carboxyl group may be electrochemically unstable within the above-described voltage ranges, and thus take part in the electrode reaction so that the electrolyte-philicity of the coating layer of the carbonaceous material may be reduced during charging and discharging cycles In some embodiments, the electrolyte-philic ion-dissociative functional group of the air electrode may be represented by one of Formulae 1 to 3:

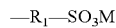    Formula 1

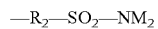    Formula 2

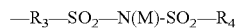    Formula 3

In Formulas 1, 2, and 3,

M may be lithium, $R_1$, $R_2$, and $R_3$ may be each independently a covalent bond, a halogen-substituted or unsubstituted C1-C10 alkylene group, a halogen-substituted or unsubstituted C6-C20 arylene group, or a halogen-substituted or unsubstituted C3-C20 heteroarylene group, and $R_4$ may be a halogen-substituted or unsubstituted C1-C10 alkyl group, a halogen-substituted or unsubstituted C6-C20 aryl group, or a halogen-substituted or unsubstituted C3-C20 heteroaryl group.

For example, the electrolyte-philic ion-dissociative functional group may be at least one of —SO$_3$Li, —C$_6$H$_5$SO$_3$Li, and —C$_6$H$_5$SO$_2$—N(Li)—SO$_2$CF$_3$, but is not limited thereto. Any suitable ion-dissociative functional group that is electrochemically stable within an operating voltage range of a lithium air battery and enables effective impregnation of the surface of the carbonaceous material with the electrolyte may be used.

The carbonaceous material of the air electrode may include, but is not limited to, at least one of carbon nanoparticles, carbon nanotubes, carbon nanofibers, carbon nanosheets, carbon nanorods, and carbon nanobelts. Any suitable carbonaceous material having a nanostructure may be used. In some embodiments, the carbonaceous material may be in micro scale. For example, the carbonaceous material may be a micro-sized structure of any of a variety of shapes, for example, particles, tubes, fibers, sheets, rods, and belts. In an embodiment, the carbonaceous material has a particle size of about 10 nm to about 200 nm, about 20 nm to about 150 nm, or about 30 nm to about 125 nm. In another embodiment, the carbonaceous material has a particle size of about 100 nm to about 1500 nm, about 200 nm to about 1400 nm, or about 300 nm to about 1300 nm. For example, the carbonaceous material may be carbon black, graphite, or the like.

The carbonaceous material of the air electrode may be porous. For example, the carbonaceous material may be mesoporous. In an embodiment, the carbonaceous material has a pore size of about 2 nm to about 50 nm, about 4 nm to about 40 nm, or about 6 nm to about 30 nm. In another embodiment, the carbonaceous material has a pore size of about 30 nm to about 300 nm, about 40 nm to about 280 nm, or about 50 nm to about 260 nm. For example, the carbonaceous material having any of the above-described shapes may be partially or fully porous.

A $I_D/I_G$ ratio of D band to G band in the Raman spectrum of the carbonaceous material may be greater than about 1.10, about 1.1 to about 1.2, or about 1.11 to about 1.18. When the $I_D/I_G$ ratio of D band to G band in the Raman spectrum of the carbonaceous material is 1.10 or less, the carbonaceous material may have be too poor in affinity to the electrolyte to be effectively impregnated therewith. For example, the $I_D/I_G$ ratio of D band to G band in the Raman spectrum of the carbonaceous material may be about 1.110 or larger, and in some embodiments, about 1.120 or larger, and in some other embodiments, about 1.140 or larger.

The electrolyte of the air electrode may include at least one of an ion-conductive polymer, an ionic liquid, and an organic liquid electrolyte, but is not limited thereto. Any suitable electrolyte available for lithium air batteries may be used. For example, the electrolyte may be an aqueous electrolyte, a non-aqueous electrolyte including an organic solvent, or the like, as described above.

The ion-conductive polymer for the electrolyte of the air electrode may include at least one of polyethylene oxide (PEO), polyvinyl alcohol (PVA), polyvinylpyrrolidone (PVP), and polysulfone, but is not limited thereto. Any suitable electrolyte having lithium ion conductivity available for lithium air batteries in the art may be used.

The ionic liquid for the electrolyte of the air electrode may include at least one of diethyl methyl ammonium trilluoromethane sulfonate ([dema][TfO]), dimethyl propyl ammonium trifluoromethanesulfonate ([dmpa] [TfO]), diethyl methyl ammonium trifluoromethane sulfonylimide ([dema] [TFSI]), and methyl propyl piperidinium trifluoromethane sulfonylimide ([mpp] [TFSI]), but is not limited thereto. Any suitable electrolyte available for lithium air batteries in the art may be used.

Non-limiting examples of the ionic liquid are linear or branched substituted compounds including cations of ammonium, imidazolium, pyrrodidinium, or piperidinium, and anions of $PF_6^-$, $BF_4^-$, $CF_3SO_3^-$, $(CF_3SO_2)_2N^-$, $(C_2F_6SO_2)_2N^-$, $(C_2F_6SO_2)_2N^-$, or $(CN)_2N^-$.

The electrolyte of the air electrode may be a solid electrolyte. When the air electrode uses a solid electrolyte, a lithium air battery having a simple structure and improved safety due to being free of liquid electrolyte leakage may be obtained.

For example, the solid electrolyte for the air electrode may be a polymer electrolyte. When the electrolyte for the air electrode is a polymer electrolyte including an ion-conductive polymer, the electrolyte may have a lithium ion conductivity in a solid phase at room temperature.

The electrolyte of the air electrode may be a solvent-free electrolyte. For example, the electrolyte of the air electrode may be a solid polymer electrolyte exclusively including an ion-conductively polymer, not including a solvent. Since the electrolyte of the air electrode includes no solvent, side reactions or leakage of the solvent may be prevented.

The solvent-free polymer electrolyte is distinct from a polymer gel electrolyte including a small amount of solvent. The polymer gel electrolyte may have improved ion conductivity due to the inclusion of a small amount of solvent in the polymer electrolyte, for example, in an ion-conductive polymer.

In some embodiments, the electrolyte of the air electrode may be a solvent-including electrolyte. The solvent-including electrolyte may be an aqueous electrolyte including an aqueous solvent or a nonaqueous electrolyte including an organic solvent.

The nonaqueous (or organic) electrolyte may include an aprotic solvent. Non-limiting examples of the aprotic solvent are a carbonate-based solvent, an ester-based, an ether-based solvent, or a ketone-based solvent. Non-limiting examples of the carbonate-based solvent are dimethyl carbonate (DMC), diethyl carbonate (DEC), ethyl methyl carbonate (EMC), dipropyl carbonate (DPC), methylpropyl carbonate (MPC), ethylpropyl carbonate (EPC), methyl ethyl carbonate (MEC), ethylene carbonate (EC), propylene carbonate (PC), butylene carbonate (BC), and tetraethylene glycol dimethyl ether (TEGDME). Non-limiting examples of the ester-based solvent are methyl acetate, ethyl acetate, n-propyl acetate, dimethyl acetate, methyl propionate, ethyl propionate, γ-butyrrolactone, decanolide, valerolactone, mevalonolactone, or caprolactone. Non-limiting examples of the ether-based solvent are dibutyl ether, tetraglyme, diglyme, dimethoxyethane, 2-methyltetrahydrofuran, and tetrahydrofuran. A non-limiting example of the ketone-based solvent is cyclohexanone. However, examples of the aprotic solvent are not limited thereto. Any suitable aprotic solvent available in the art may be used.

Examples of the aprotic solvent are nitriles (such as R—CN, wherein R is a linear, branched, or cyclic C2-C20 hydrocarbon-based moiety that may include a double-bonded aromatic ring or an ether bond), amides (such as dimethylformamide), dioxolanes (such as 1,3-dioxolane), and sulfolanes.

The above-listed aprotic solvents may be used alone or in a combination of at least two thereof. In the latter, a mixing ratio of the at least two aprotic solvents may be appropriately adjusted depending on a desired performance of the battery. This will be obvious to one of ordinary skill in the art.

The electrolyte of the air electrode may include a salt of at least one of an alkali metal and an alkaline earth metal. The salt of the at least one alkali metal and alkaline earth metal may be dissolved in an organic solvent to serve as a source of at least one of alkali metal ions and alkaline earth metal ions in the battery. For example, the salt may facilitate migration of the alkali metal ions and/or alkaline earth metal ions between the air electrode and negative electrode.

For example, cations of the alkali metal salt and/or alkaline earth metal salt may include lithium ions, sodium ions, magnesium ions, potassium ions, calcium ions, rubidium ions, strontium ions, cesium ions, barium ions, and the like.

For example, anions of the alkali metal salt and/or alkaline earth metal salt in the electrolyte may be least one selected from $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (where x is a natural number, such as 1 to 6), $(C_xF_{2x+1}SO_2)(C_yF_{2y+1}SO_2)N^-$ (where x and y are natural numbers, such as 1 to 6), and halides.

For example, the alkali metal salt and/or alkaline earth metal salt may be one or at least two selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are each independently from 1 to 30), LiF, LiBr, LiCl, LiI, $LiB(C_2O_4)_2$ (lithium bis (oxalato) borate; LiBOB) LiTFSI (lithium bis(trifluoromethanesulfonyl)Imide), and $LiNO_3$, but is not limited thereto. Any alkali metal salt and/or alkaline earth metal salt available in the art may be used.

In the electrolyte of the air electrode, the amount of at least one of the alkali metal salt and alkaline earth metal salt may be in a range of about 100 millimolar (mM) to about 10 M, and in some embodiments, about 500 mM to about 2 M.

When the electrolyte of the air battery is a polymer electrolyte, a mole ratio of monomers of the polymer to lithium ions may be in a range of about 40:1 to about 5:1, or about 35:1 to about 10:1. For example, when the polymer electrolyte is polyethylene oxide, a mole ratio of ethylene oxide groups as monomers of the polyethylene oxide to lithium ions may be about 10:1 to about 16:1. The mole ratio of monomers to lithium ions may be not particularly limited, as long as the electrolyte may effectively transfer lithium ions and/or electrons during charge and discharge.

According to another embodiment of the present disclosure, a lithium air battery includes: a negative electrode that allows alloying and dealloying, e.g., intercalation and deintercalation, of lithium ions; any of the air electrodes according to the above-described embodiments; and a separator disposed between the negative electrode and the air electrode In some embodiments the negative electrode that allows alloying and dealloying, e.g., intercalation and deintercalation, of lithium may include a lithium metal, a lithium metal-based alloy, or a material that allows alloying and dealloying, e.g., intercalation and deintercalation, of lithium. Materials for the negative electrode are not particularly limited to these materials, and any suitable material available in the art that includes Li or allows alloying and dealloying, e.g., intercalation and deintercalation, of lithium may be used. The negative electrode can determine the capacity of the lithium air battery. In this regard, the negative electrode may be, for example, a lithium metal. Examples of the lithium-based alloy are lithium alloys with aluminum (Al), tin (Sn), magnesium (Mg), indium (In), calcium (Ca), titanium (Ti), vanadium (V), and combinations thereof.

The separator is not specifically limited, as long as it has a composition durable in an operating condition of the lithium air battery. For example, the separator may be a polymer non-woven fabric, such as polypropylene-based non-woven fabric or polyphenylene sulfide-based non-woven fabric, a porous film of an olefin-based polymer, such as polypropylene or polyethylene, which may be used in a combination of at least one thereof.

In some embodiments, the lithium air battery may further include a lithium ion-conductive solid electrolyte membrane disposed on a surface of the air electrode or negative electrode. For example, the lithium ion-conductive solid electrolyte membrane may serve as a protective membrane to protect lithium of the negative electrode from directly reacting with impurities such as water and oxygen in the aqueous electrolyte. For example, the lithium ion-conductive solid electrolyte membrane may be an inorganic material such as lithium ion-conductive glass, lithium ion-conductive crystals (ceramic or glass-ceramic), or a mixture thereof, but is not limited thereof. Any suitable solid electrolyte membrane available in the art that has lithium ion conductivity and may protect the air electrode or negative electrode may be used. For example, the lithium ion-conductive solid electrolyte membrane may be an oxide in view of chemical stability.

For example, the lithium ion-conductive crystals may be $Li_{1+x+y}(Al_qGa_{1-q})_x(Ti_rGe_{1-r})_{2-x}Si_yP_{3-y}O_{12}$ wherein $0 \leq x \leq 1$, $0 \leq y \leq 1$, $0 \leq q \leq 1$, and $0 \leq r \leq 1$, for example, $0 \leq x \leq 0.4$, $0 < y \leq 0.6$, $0 \leq q < 1$, and $0 \leq r < 1$, or $0.1 \leq x \leq 0.3$, $0.1 < y \leq 0.4$, $0 < q < 1$, and $0 < r < 1$. The lithium ion-conductive glass-ceramic may be, for example, lithium-aluminum-germanium-phosphate (LAGP), lithium-aluminum-titanium-phosphate (LATP), or lithium-aluminum-titanium-silicon-phosphate (LATSP).

The lithium ion-conductive solid electrolyte membrane may further include a polymer solid electrolyte component, in addition to the glass-ceramic component. For example, the polymer solid electrolyte component may comprise a polyethylene oxide doped with a lithium salt. For example, the lithium salt may be $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or the like.

The lithium ion-conductive solid electrolyte membrane may further include an inorganic solid electrolyte component, in addition to the glass-ceramic component. For example, the inorganic solid electrolyte component may include $Cu_3N$, $Li_3N$, LiPON, or the like.

An example of manufacturing the lithium air battery is as follows.

First, any of the air electrodes disclosed herein including a carbonaceous material, a negative electrode that allows alloying and dealloying, e.g., intercalation and deintercalation, of lithium, and a separator may be provided.

Next, the negative electrode may be disposed in a side region of a case, the separator may be disposed on the negative electrode, and the air electrode with a lithium ion-conductive solid electrolyte membrane may be disposed such that the lithium ion-conductive solid electrolyte membrane is opposite to the negative electrode. Next, a porous current collector may be disposed on the air electrode, and a pressing member that allows air to reach the positive electrode may be fixed to a cell by pressing, thereby completing the manufacture of the lithium air battery.

Next, a liquid electrolyte solution including a lithium salt may be injected into the separator disposed on the negative electrode. For example, a propylene carbonate electrolyte solution including 1.0 M LiTFSI may be injected into the separator.

The case may be divided into upper and lower parts, which contact the negative and positive electrodes, respectively. An insulating resin may be disposed between the upper and lower parts to electrically insulate the positive and negative electrodes from each other.

The lithium air battery is available either as a lithium primary battery or a lithium secondary battery. The lithium air battery may have any of various shapes, and in some embodiments, may have a shape like a coin, a button, a sheet, a stack, a cylinder, a plane, or a horn. The lithium air battery may be applicable as a large battery for electric vehicles.

FIG. 1 is a schematic view of an embodiment of a lithium air battery 10. The lithium air battery 10 includes an air electrode 15 using oxygen as an active material and adjacent to a first current collector 14, a negative electrode 13 including lithium and adjacent to a second current collector 12, and a separator 16 disposed between the air electrode 15 and the negative electrode 13. A lithium ion-conductive solid electrolyte membrane (not shown) may be further disposed on a surface of the air electrode 15 opposite to the separator 16. The first current collector 14, which is porous, may serve as a gas diffusion layer allowing diffusion of gas. A pressing member 19 for transferring air to the air electrode 15 may be disposed on the first current collector 14. A case 11 made of an insulating resin may be disposed between the air electrode 15 and the negative electrode 13 to electrically separate the air electrode 15 and the negative electrode 13 from each other. Air may be supplied via an air inlet 17a, and discharged via an air outlet 17b. The lithium air battery 10 may be placed in a stainless steel reactor.

As used herein, the term "air" is not limited to atmospheric air, and may refer to a combination of gases including oxygen, or pure oxygen gas. This broad definition of "air" also apply to all related terms, including "air battery", and "air electrode."

According to another embodiment of the present disclosure, a method of manufacturing an air electrode includes:

contacting a starting carbonaceous material with a proton-dissociative functional group-containing compound to obtain a carbonaceous material comprising a plurality of proton-dissociative functional groups; and treating the carbonaceous material comprising the plurality of proton-dissociative functional groups with a neutralizing agent to obtain a carbonaceous material having an ion-dissociative functional group represented by one of Formulas 1 to 3:

—$R_1$—$SO_3M$      Formula 1

—$R_2$—$SO_2$—$NM_2$      Formula 2

—$R_3$—$SO_2$—N(M)-$SO_2$—$R_4$      Formula 3 wherein, in Formulae 1, 2, and 3,

M may be lithium, $R_1$, $R_2$, and $R_3$ may be each independently a covalent bond, a halogen-substituted or unsubstituted C1-C10 alkylene group, a halogen-substituted or unsubstituted C6-C20 arylene group, or a halogen-substituted or unsubstituted C3-C20 heteroarylene group, and R$_4$ may be a halogen-substituted or unsubstituted C1-C10 alkyl group, a halogen-substituted or unsubstituted C6-C20 aryl group, or a halogen-substituted or unsubstituted C3-C20 heteroaryl group.

The starting carbonaceous material used in the air electrode manufacturing method may include at least one of carbon nanoparticles, carbon nanotubes, carbon nanofibers, carbon nanosheets, carbon nanorods, and carbon.

The proton-dissociative functional group-containing compound used in the air electrode manufacturing method may include at least one of 4-aminobenzenesulfonic acid and chlorosulfuric acid.

The neutralizing agent used in the air electrode manufacturing method may include at least one of LiOH, LiCl, and LiClO$_4$.

The air battery manufacturing method may include: contacting a starting carbonaceous material with a proton-dissociative functional group-containing compound to obtain a carbonaceous material having a plurality of proton-dissociative functional groups coated on a surface thereof; and treating the carbonaceous material having the plurality of proton-dissociative functional groups coated on the surface thereof with a neutralizing agent to obtain a carbonaceous material having an ion-dissociative functional group coated on the surface thereof and represented by one of Formulas 1 to 3 mentioned above.

In some embodiments, the air electrode may be manufactured as follows. A carbonaceous material, a lithium salt, and an electrolyte may be mixed together, and heated with or without an addition of an appropriate solvent to prepare an air electrode slurry. The air electrode slurry may be coated on a surface of an electric current collector, e.g., a metal foil or carbon mesh, and then dried, thereby manufacturing the air electrode. In some embodiments, to improve the density of the air electrode, the air electrode may be manufactured by press-molding the air electrode slurry onto the electric current collector. The current collector may be a gas diffusion layer. In some embodiments, the air electrode slurry may be coated on a surface of the separator or solid electrolyte membrane and then dried, optionally followed by press-molding to improve a density of the air electrode, thereby manufacturing the air electrode.

The lithium salt and the electrolyte used in the air electrode slurry may be the same as described above in conjunction with the embodiments of the air electrodes.

Optionally, the air electrode slurry may include a binder. The binder may be a commercially available binder, and may include at least one of a thermoplastic resin and a thermocurable resin. Non-limiting examples of the binder are polyethylene, polypropylene, polytetrafluoroethylene (PTFE), polyvinylidene fluoride (PVdF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer, which may be used alone or in a combination. Any appropriate binder available in the art may be used.

The separator is not specifically limited, as long as it has a composition that is durable in an operating condition of the lithium air battery. For example, the separator may be a polymer non-woven fabric, such as polypropylene-based non-woven fabric or polyphenylene sulfide-based non-woven fabric, a porous film of an olefin-based polymers, such as polypropylene or polyethylene, which may be used in a combination of at least two thereof. The separator will be described in greater detail below in conjunction with a lithium air battery.

A porous structure in a matrix or mesh form may be used as the current collector to facilitate diffusion of oxygen. A porous metal plate comprising, for example, stainless steel, nickel, or aluminum may be used. Materials for the current collector are not particularly limited, and any appropriate material for current collectors available in the art may be used. The current collector may be coated with an anti-oxidation metal or alloy to prevent oxidation.

Optionally, the air electrode slurry may include an oxygen oxidation/reduction catalyst and a conducting agent. Optionally, the air electrode slurry may include a lithium oxide.

Any suitable conducting agent may be used as long as it is porous and conductive, and in some embodiments, a porous carbonaceous material may be used. For example, the porous carbonaceous material may be a carbon black, graphite, graphene, activated carbon, carbon fiber, and combinations thereof. Metallic conductive materials, including metal fibers and metal meshes, may be used. Metal powder of copper, silver, nickel, aluminum, and the like may be used. Organic conductive materials, including polyphenylene derivatives, may be used. The above-listed conductive materials may be used alone or in a combination.

Hereinafter, an embodiment will be described in greater detail with reference to the following examples. However, these examples are not intended to limit the scope of the one or more embodiments.

"Alkylene" means a straight or branched chain, saturated, divalent aliphatic hydrocarbon group, (e.g., methylene (—CH$_2$—) or, propylene (—(CH$_2$)$_3$—)).

"Arylene" means a divalent group formed by the removal of two hydrogen atoms from one or more rings of an arene, wherein the hydrogen atoms may be removed from the same or different rings (e.g., phenylene or napthylene).

"Alkyl" as used herein means a straight or branched chain, saturated, monovalent hydrocarbon group (e.g., methyl or hexyl).

"Aryl" means a monovalent group formed by the removal of one hydrogen atom from one or more rings of an arene (e.g., phenyl or napthyl).

The prefix "hetero" means that the compound or group includes at least one a heteroatom (e.g., 1, 2, or 3 heteroatom(s)), wherein the heteroatom(s) is each independently N, O, S, Si, or P.

"Alkali metal" means a metal of Group 1 of the Periodic Table of the Elements, i.e., lithium, sodium, potassium, rubidium, cesium, and francium.

"Alkaline earth metal" means a metal of Group 2 of the Periodic Table of the Elements, i.e., beryllium, magnesium, calcium, strontium, barium, and radium.

EXAMPLES

Preparation of Carbonaceous Material

Example 1

0.1 g of Ketjen black (EC 600JD, available from Ketjen Black International Company) was dispersed in 150 mL of a mixed solution of water and acetone (1:1 by volume) for about 30 minutes, followed by adding 3 mg of 4-aminobenzenesulfonic acid and 2.28 mg of sodium nitride ($NaNO_2$).

30 mL of a conc. HCl (30%, Aldrich) was added to the resulting solution and stirred at room temperature for about 4 hours for reaction. After completion of the reaction, the reaction product was filtered and dried in a vacuum.

The resulting product was dispersed in a 1:1 mixed solution of water and methanol, and an excess of LiOH was added thereto and stirred at room temperature for 3 days for reaction. After completion of the reaction, the reaction product was filtered and dried in a vacuum to obtain a carbonaceous material with —$C_6H_5SO_3Li$ coated on a surface thereof as shown below in Reaction Scheme 1.

Reaction Scheme 1

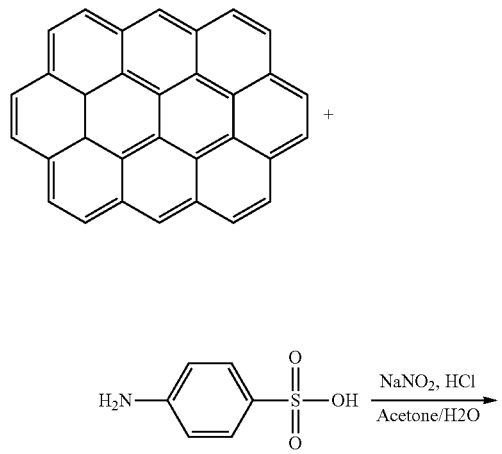

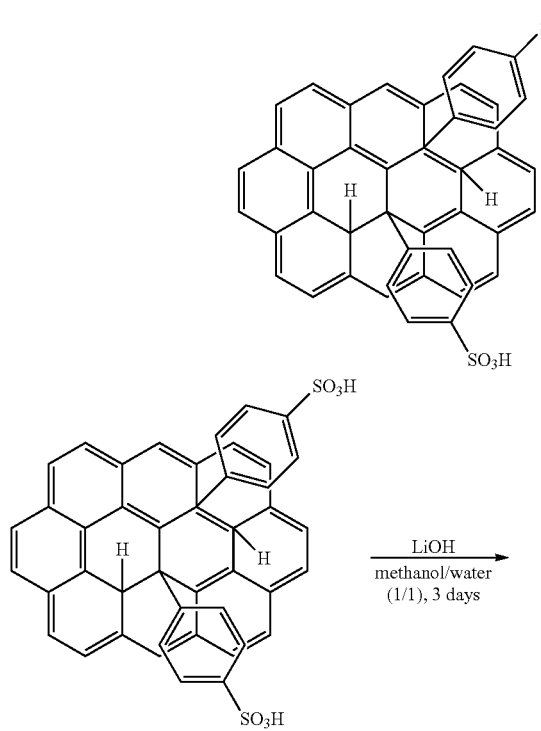

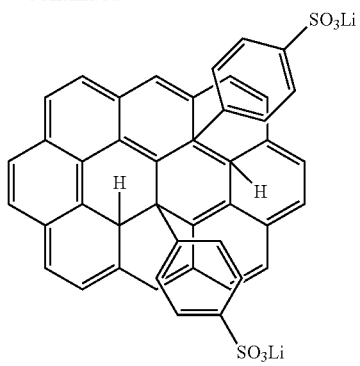

Example 2

A carbonaceous material with —$C_6H_5SO_3Li$ coated on a surface thereof was obtained in the same manner as in Example 1, except that carbon black (Printex®, Orion Engineered Chemicals, USA), instead of Ketjen black, was used.

Example 3

0.1 g of Ketjen black (EC 600JD, available from Ketjen Black International Company) was dispersed in 100 mL of dichloromethane for about 30 minutes, and kept at about 0° C. 0.2 mL of chlorosulfuric acid was added to the resulting dispersion, and stirred for about 2 hours for reaction. After completion of the reaction, the reaction product was filtered and dried in a vacuum.

The resulting product was dispersed in a 1:1:1 mixed solvent of water, methanol and acetone, and an excess of LiOH was added thereto and stirred at room temperature for 3 days for reaction. After completion of the reaction, the reaction product was filtered and dried in a vacuum to obtain a carbonaceous material with —$SO_3Li$ coated on a surface thereof.

Reaction Scheme 2

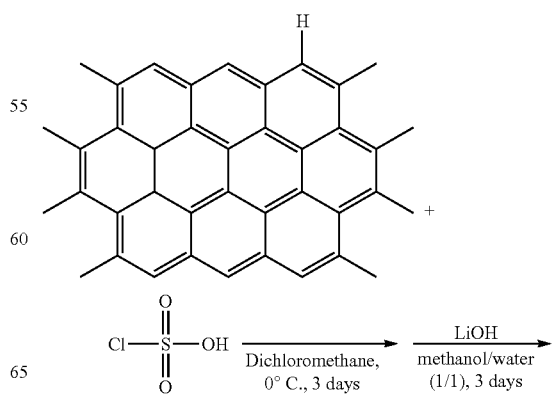

-continued

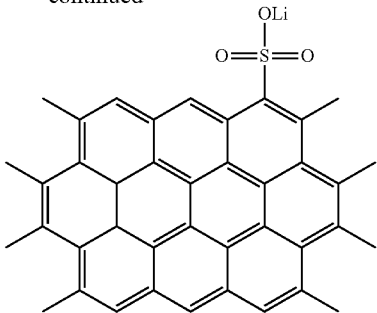

Example 4

A carbonaceous material with —SO$_3$Li coated on a surface thereof was obtained in the same manner as in Example 3, except that carbon black (Printex®, Orion Engineered Chemicals, USA), instead of Ketjen black, was used.

Comparative Example 1

A Ketjen black (EC 600JD, available from Ketjen Black International Company) was used as it was without surface treatment as a carbonaceous material.

Comparative Example 2

A carbon black (Printex®, Orion Engineered Chemicals, USA) was used as it was without surface treatment as a carbonaceous material.

Comparative Example 3

A carbon black (Vulcan® XC72R, available from Cabot Corporation, USA) was used as it was without surface treatment as a carbonaceous material.

Comparative Example 4

A carbonaceous material with —C$_6$H$_5$SO$_3$Li coated on a surface thereof was obtained in the same manner as in Example 1, except that carbon black (Vulcan® XC72R, available from Cabot Corporation, USA), instead of Ketjen black, was used.

Manufacture of Air Electrode

Example 5

A polyethylene oxide (PEO600k, Aldrich, 182028) as an ion-conductive polymer and LiTSI as a lithium salt were mixed in a 1:10 mole ratio of Li to EO on a hot plate to prepare an electrolyte. The electrolyte was mixed with the carbonaceous material of Example 1 in a weight ratio of 6:1 to obtain an air electrode slurry.

The air electrode slurry was coated on a lithium-aluminum titanium phosphate (LATP) solid electrolyte membrane (having a thickness of about 250 µm, available from Ohara Corp., Japan) to reach an amount of about 2.0 mg/cm$^2$ (i.e., per an area of about 1 cm×1 cm), thereby manufacturing an air electrode for use in manufacturing a lithium air battery.

Example 6

A polyethylene oxide (PEO100k, Aldrich, 181986) as an ion-conductive polymer and LiTSI as a lithium salt were mixed in a 1:10 mole ratio of Li to EO on a hot plate to prepare an electrolyte. The electrolyte was mixed with the carbonaceous material of Example 2 in a weight ratio of 5:1 to obtain an air electrode slurry.

The air electrode slurry was coated on a LATP solid electrolyte membrane (having a thickness of about 250 µm, available from Ohara Corp., Japan) to reach an amount to be about 2.0 mg/cm$^2$ (i.e., per an area of about 1 cm×1 cm), thereby manufacturing an air electrode for use in manufacturing a lithium air battery.

Example 7

An air electrode was manufactured in the same manner as in Example 5, except that the carbonaceous material of Example 3, instead of the carbonaceous material of Example 1, was used.

Example 8

An air electrode was manufactured in the same manner as in Example 6, except that the carbonaceous material of Example 4, instead of the carbonaceous material of Example 1, was used.

Comparative Example 5

An air electrode was manufactured in the same manner as in Example 5, except that the carbonaceous material of Comparative Example 1, instead of the carbonaceous material of Example 1, was used.

Comparative Examples 6 to 8

Air electrodes were manufactured in the same manner as in Example 6, except that the carbonaceous materials of Comparative Examples 2 to 4 were used, respectively, instead of the carbonaceous material of Example 2.

Manufacture of Lithium Air Battery

Example 9

A separator (Celgard 3501) was disposed on a lithium metal thin-film negative electrode, and 0.2 mL of an electrolyte solution of 1M lithium bis(trifluoromethanesulfonyl) imide (LiTFSI) dissolved in propylene carbonate (PC) was injected into the separator.

The air electrode of Example 5 coated on the LATP solid electrolyte membrane was disposed on a surface of the separator.

Next, a gas diffusion layer (GDL, 25BC, available from SGL Group) was attached on a surface of the air electrode, a nickel mesh was disposed on the GDL, and a pressing member that allows air to reach the air electrode was disposed on the nickel mesh to press and to fix a whole cell, thereby manufacturing a lithium air battery.

An exemplary structure of the lithium air battery is shown in FIG. 1.

Examples 10 to 12

Lithium air batteries were manufactured in the same manner as in Example 9, except that the air electrodes of Examples 5 to 8 were used, respectively.

Comparative Examples 9 to 12

Lithium air batteries were manufactured in the same manner as in Example 9, except that the air electrodes of Comparative Examples 5 to 8 were used, respectively.

Evaluation Example 1

Electrolyte-Philicity Evaluation

Each of the carbonaceous materials of Example 2 and Comparative Example 2 was dispersed in water and sonicated for about 1 hour.

Figure 2A:
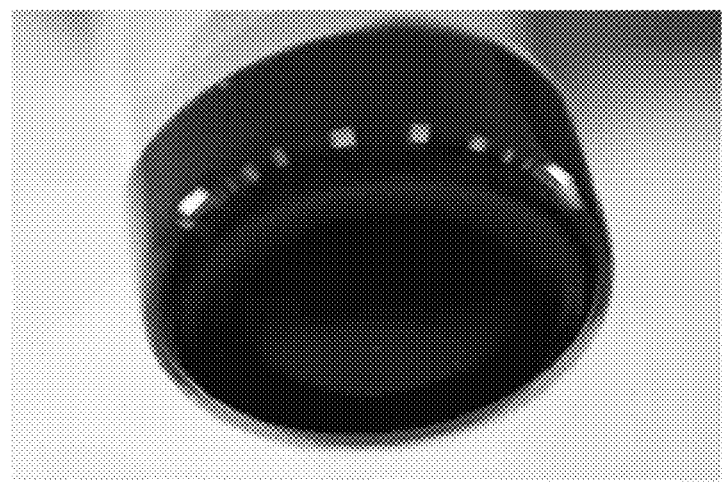
FIGS. 2A and 2B are images illustrating water dispersibilities of carbonaceous materials of Example 2 and Comparative Example 2.
Figure 2B:
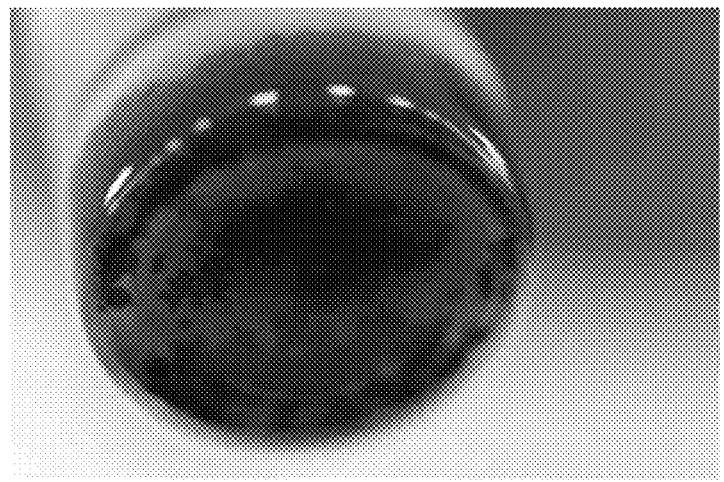

The carbonaceous material of Example 2 was found to remain dispersed after leaving the sonicated solution for 2 hours as it is, as shown in FIG. 2A. However, the carbonaceous material of Comparative Example 2 was mostly precipitated as shown in FIG. 2B.

Accordingly, the surface-coated carbonaceous material of Example 2 was found to have markedly improved electrolyte-philicity.

Evaluation Example 2

Infrared (IR) Spectroscopy Evaluation

Functional groups present in the carbonaceous material of Example 1 were identified by Fourier-Transform Infrared (FT-IR) spectroscopy.

Figure 3A:
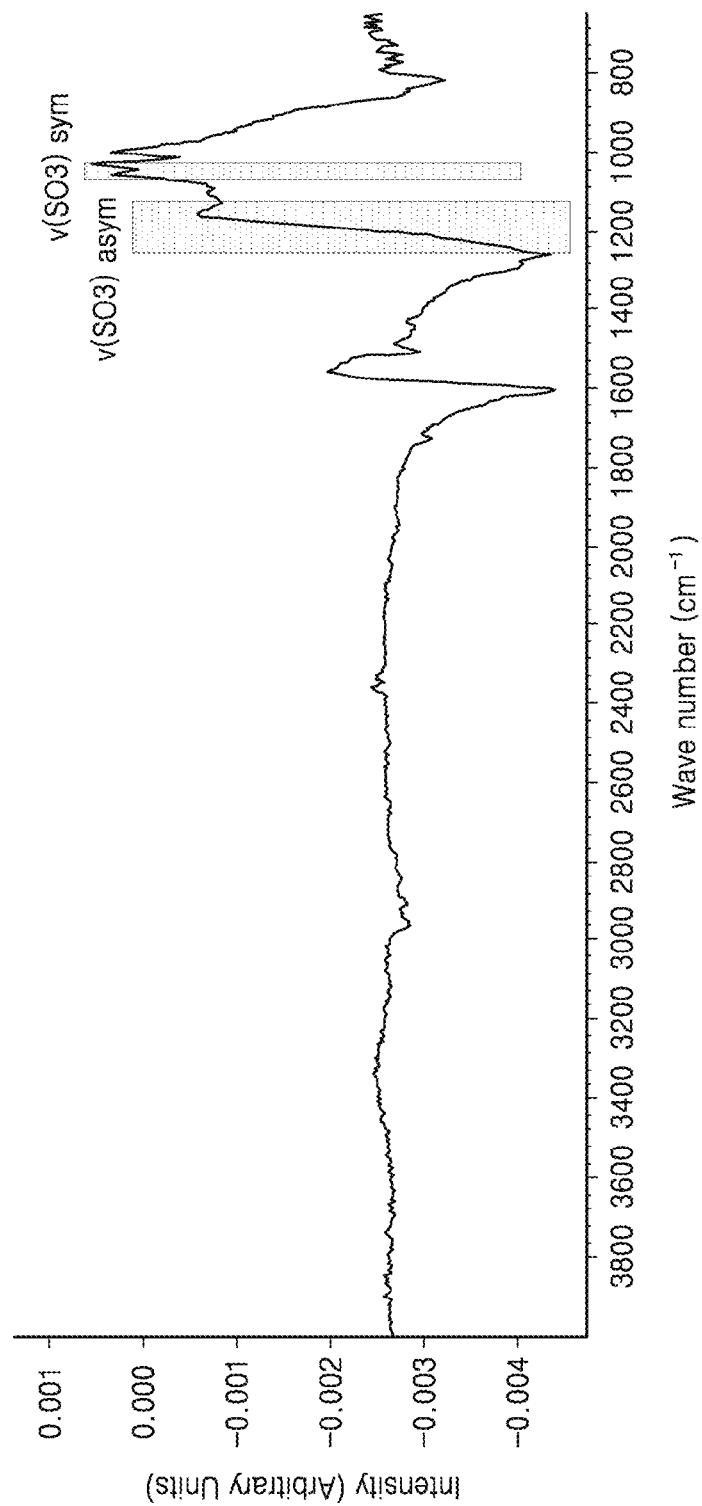
FIG. 3A is graph of intensity (arbitrary units) versus wavenumber ($cm^-$) and is a Fourier-Transform Infrared (FT-IR) spectrum of a carbonaceous material of Example 1.
Figure 3B:
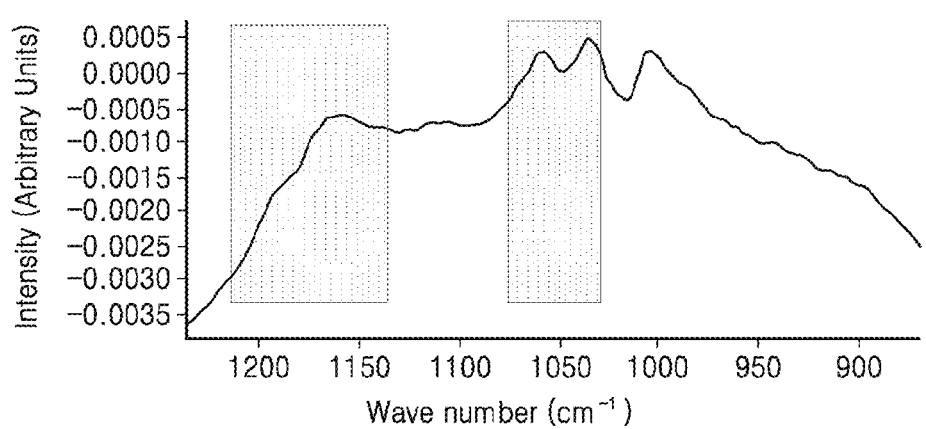
FIG. 3B is an enlarged view of a portion of FIG. 3A.

Referring to FIGS. 3A and 3B, peaks of $SO_3$ asymmetric vibration mode ($v(SO_3)_{asym}$) were observed at about 1250~1140 cm⁻ and peaks of symmetric vibration mode ($V(SO_3)_{sym}$) were observed at about 1070~1030 cm⁻.

Evaluation Example 3

Porosity Evaluation

Nitrogen adsorption and desorption isotherms of the carbonaceous materials of Examples 1 to 4 and Comparative Examples 1 to 4 were obtained, and a specific surface area by Brunauer-Emmett-Teller (BET) and a pore size distribution (4V/A by BET) by non-local density functional theory (NLDFT) of each of the carbonaceous materials were calculated. Some of the evaluation results are shown in Table 1.

TABLE 1

| Example | BET specific surface area [m²/g] |
| --- | --- |
| Example 4 | 997 |
| Comparative Example 1 | 1250 |
| Comparative Example 2 | 1502 |
| Comparative Example 3 | 250 |

Figure 4:
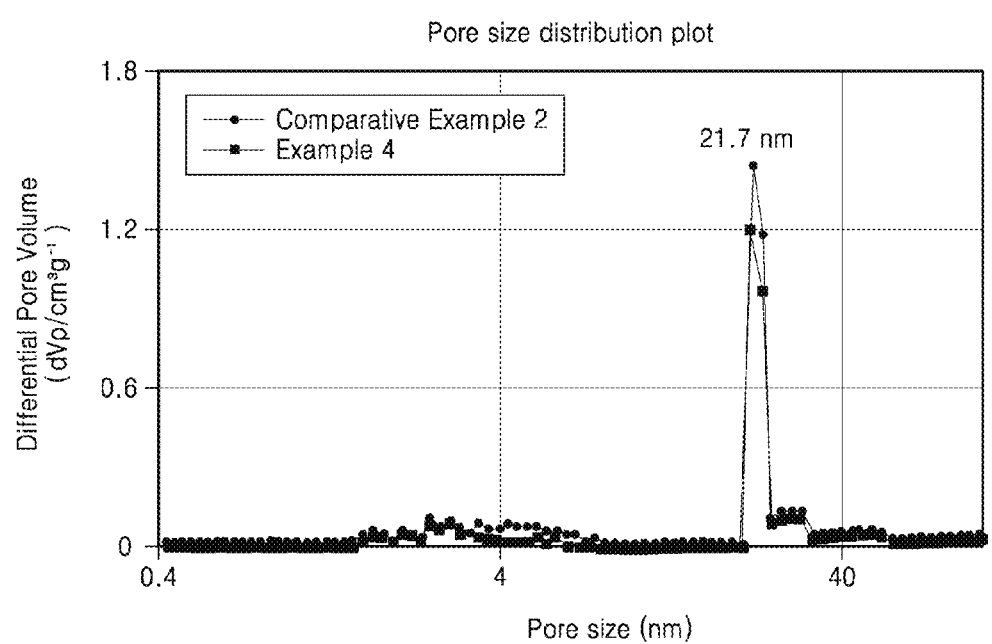
FIG. 4 is a graph of differential pore volume ($cm^3 g^-$) versus pore size (nanometers) and is a pore size distribution plot of carbonaceous materials of Example 4 and Comparative Example 2.

Referring to FIG. 4, in the pore size distribution plot of the carbonaceous materials of Comparative Example 2 and Example 4, the pore size at a maximum pore volume (dominant pore size) was the same at about 21.7 nm in both of the carbonaceous materials of Comparative Example 1 and Example 4, indicating that coating a surface of a carbonaceous material with an ion-dissociative functional group may substantially not affect the pore size.

Evaluation Example 4

Raman Spectrum Measurement

Surface characteristics of the carbonaceous materials of Example 1 and Comparative Example 1 were evaluated by Raman spectroscopy.

Figure 5A:
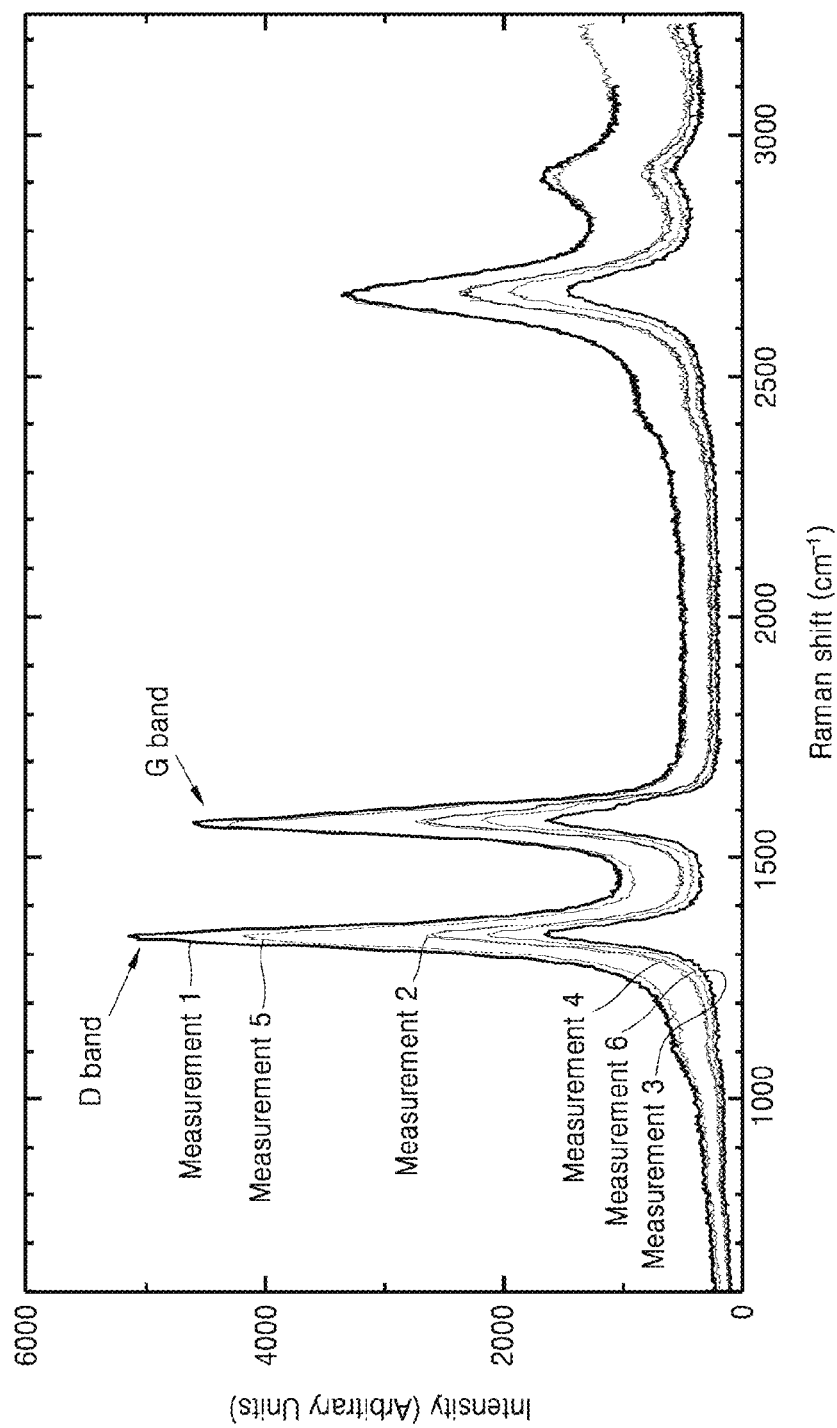
FIGS. 5A and 5B are each a graph of intensity (arbitrary units) versus Raman shift ($cm^-$) showing Raman spectra of the carbonaceous materials of Example 1 and Comparative Example 1, respectively.
Figure 5B:
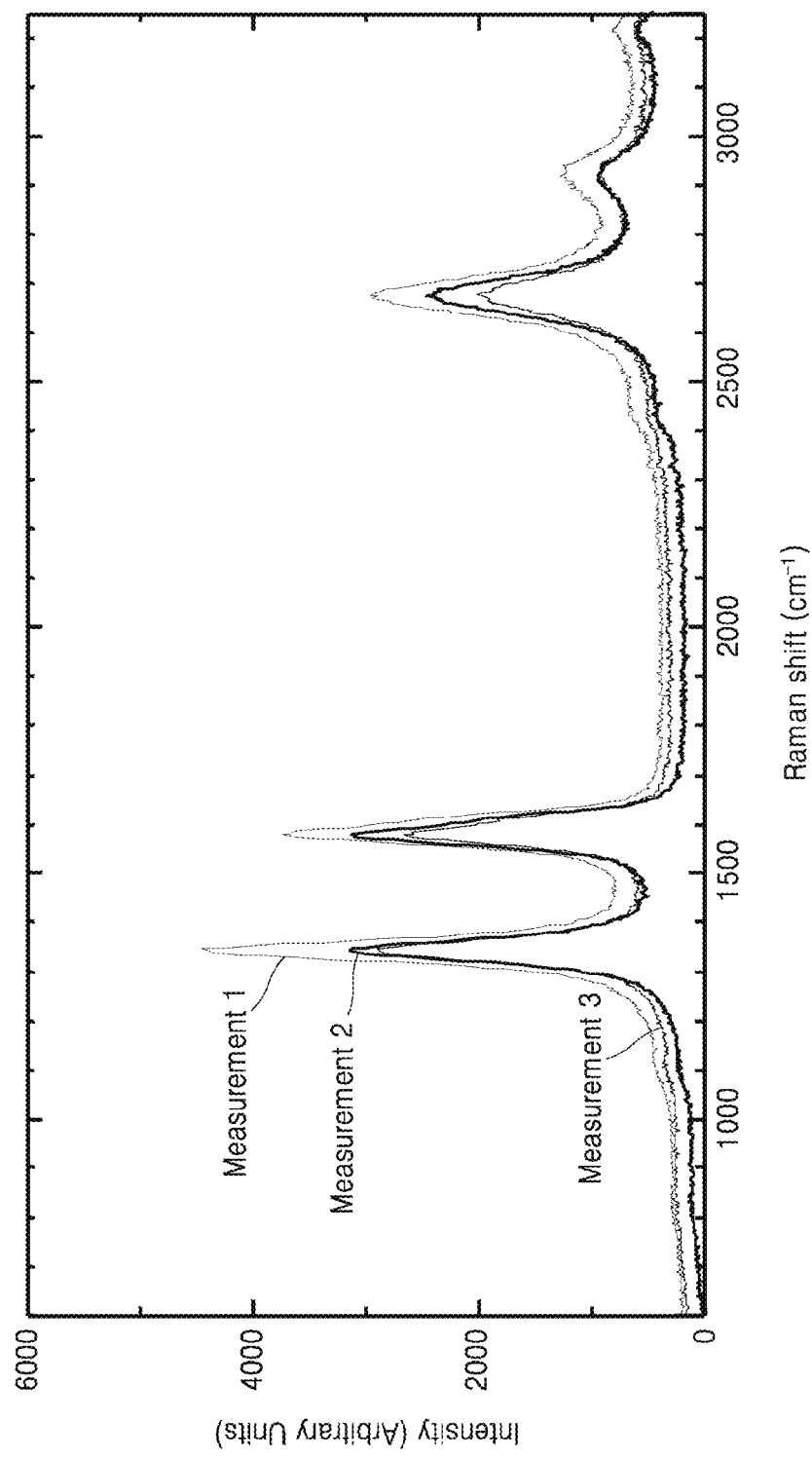

As illustrated in FIGS. 5A and 5B, the coated carbonaceous material of Example 1, and the uncoated carbonaceous material of Comparative Example 1 were analyzed by Raman spectroscopy six times and three times, respectively, to calculate intensity ($I_D/I_G$) ratios of D band to G band of the carbonaceous materials. Averages of the intensity $I_D/I_G$ ratios are shown in Table 1.

TABLE 2

| Example | $I_D/I_G$ ratio of D band to G band |
| --- | --- |
| Example 1 | 1.149 |
| Comparative Example 1 | 1.038 |

Referring to Table 1, the coated carbonaceous material of Example 1 had a $I_D/I_G$ ratio of about 1.149, and the uncoated carbonaceous material of Comparative Example 1 had $I_D/I_G$ ratio of about 1.038.

The larger $I_D/I_G$ ratio of the coated carbonaceous material of Example 1, compared to the uncoated carbonaceous material of Comparative Example 1, is attributed to that —$C_6H_5SO_3Li$ functional groups were bound to the surface of the carbonaceous material of Example 1 to form a $SP_3$ bond among $SP_2$ bonds on the surface of the carbonaceous material, increasing a degree of disordering on the surface of the carbonaceous material.

Evaluation Example 5

Charge-Discharge Characteristics Evaluation

Figure 6A:
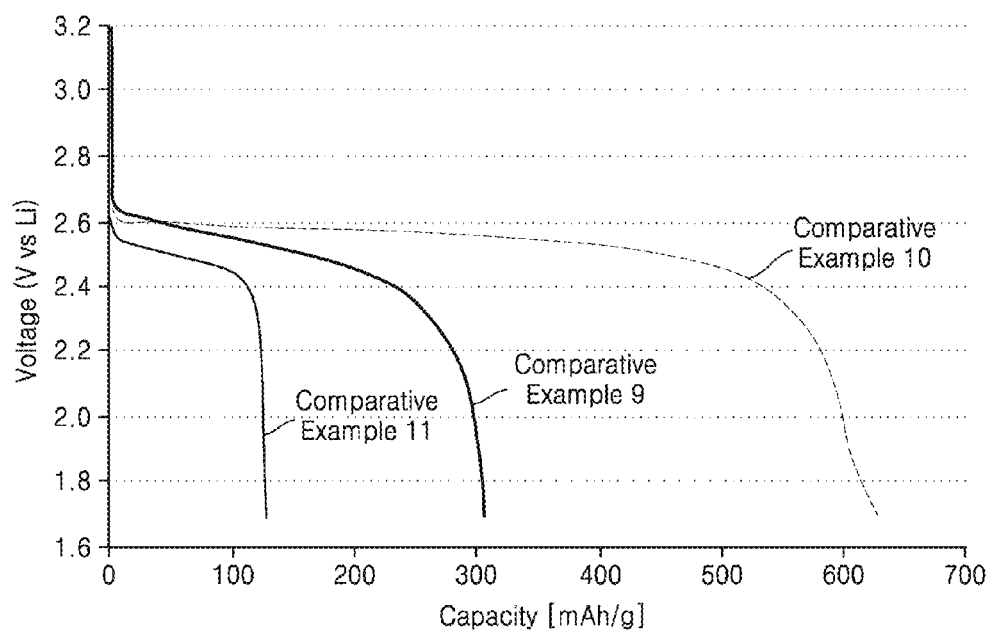
FIGS. 6A and 6B are each a graph of voltage (volts versus lithium, V vs Li) versus capacity (milliampere hours per gram, mAh/g) resulting from a charge-discharge test on lithium air batteries of Comparative Examples 9 to 11 and Comparative Example 9 and Example 9 after the $1^{st}$ cycle.
Figure 6B:
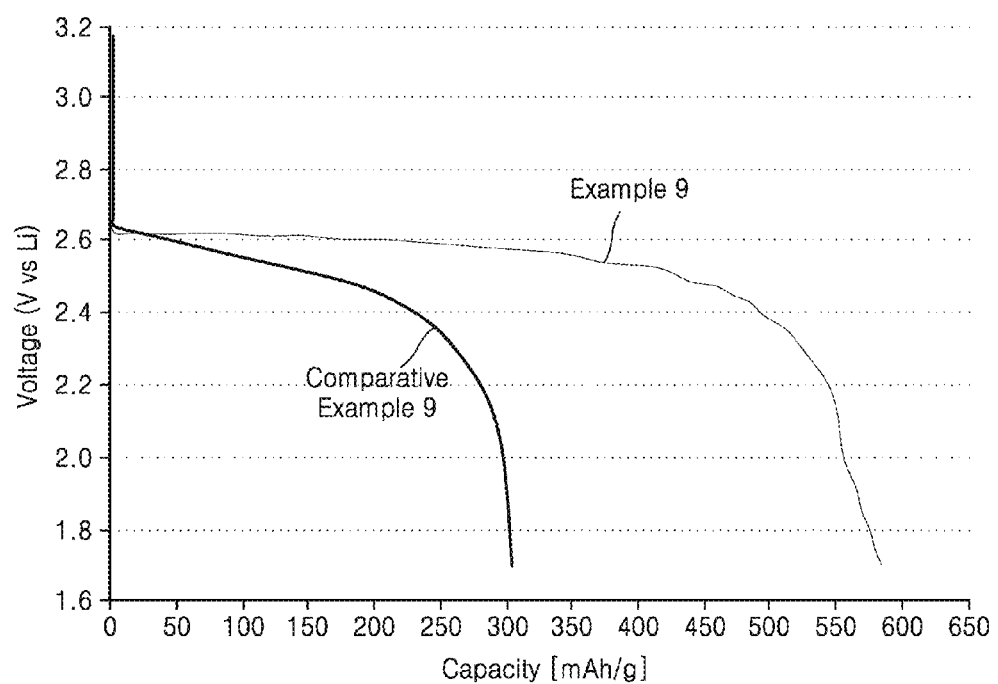

The lithium air batteries of Examples 9 to 12 and Comparative Examples 9 to 12 were each subjected to a charge-discharge cycle of discharging at about 60° C. at about 1 atm with a constant current of about 0.24 mA/cm² to a voltage of about 1.7V (with respect to Li), followed by charging with the same current to about 4.2V and then charging to a current of about 0.02 mA/cm². Some of the results of the charge-discharge test after the 1$^{st}$ cycle are shown in Table 3 and FIGS. 6A and 6B.

The unit weight in terms of discharge capacity is a total weight of an air electrode including a carbonaceous material, a lithium salt, and an electrolyte.

TABLE 3

| Example | Discharge capacity [mAh/g] |
| --- | --- |
| Example 9 | 583 |
| Example 10 | 880 |
| Comparative Example 9 | 305 |
| Comparative Example 10 | 626 |
| Comparative Example 11 | 128 |
| Comparative Example 12 | Not available |

Referring to Table 3, the lithium air batteries of Examples 9 and 10 had markedly increased discharge capacities, in spited of relatively small BET specific surface areas compared to the lithium air batteries of Comparative Examples 9 and 11.

Such an increase in discharge capacity in the lithium air batteries of Examples 9 and 10 is attributed to that an increased contacting area between the carbonaceous material and the electrolyte increased lithium ion conductivity in the air electrode of the lithium air battery.

The lithium air battery of Comparative Example 12, though using a coated carbonaceous material, did not give detectable discharge capacity. It is understood that such a small specific surface area of the carbonaceous material used in Comparative Example 12 causes a negative effect due to the interruption of electron transfer by the ion-dissociative groups, acting as defects, bonded on the surface of the carbonaceous material to offset a positive effect due to an increased contacting area between the carbonaceous material and the electrolyte.

As described above, according to the above embodiments, a lithium air battery including a surface-modified carbonaceous material according to any of the above-described embodiments may have an improved discharge capacity.

It should be understood that the exemplary embodiments described therein shall be considered in a descriptive sense only and not for purposes of limitation. Descriptions of features, advantages, or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An air electrode comprising:
   a carbonaceous material having an electrolyte-philic ion-dissociative functional group disposed on a surface thereof;
   a lithium salt; and
   an electrolyte,
   wherein the carbonaceous material has a specific surface area of about 500 square meters per gram or greater, and the electrolyte-philic ion-dissociative functional group is electrochemically stable in a voltage range of about 1.5 volts to about 4.5 volts with respect to lithium, wherein the air electrode is configured to use oxygen as an electrode active material.

2. The air electrode of claim 1, wherein the electrolyte-philic ion-dissociative functional group is represented by one of Formulas 1 to 3:

—R$_1$—SO$_3$M          Formula 1

—R$_2$—SO$_2$—NM$_2$          Formula 2

—R$_3$—SO$_2$—N(M)-SO$_2$—R$_4$          Formula 3 wherein, in Formulas 1, 2, and 3,
   M is lithium,
   R$_1$, R$_2$, and R$_3$ are each independently a covalent bond, a halogen-substituted or unsubstituted C1-C10 alkylene group, a halogen-substituted or unsubstituted C6-C20 arylene group, or a halogen-substituted or unsubstituted C3-C20 heteroarylene group, and
   R$_4$ is a halogen-substituted or unsubstituted C1-C10 alkyl group, a halogen-substituted or unsubstituted C6-C20 aryl group, or a halogen-substituted or unsubstituted C3-C20 heteroaryl group.

3. The air electrode of claim 1, wherein the electrolyte-philic ion-dissociative functional group is at least one of —SO$_3$Li, —C$_6$H$_5$SO$_3$Li, and —C$_6$H$_5$SO$_2$—N(Li)—SO$_2$CF$_3$.

4. The air electrode of claim 1, wherein the carbonaceous material comprises at least one of carbon nanoparticles, carbon nanotubes, carbon nanofibers, carbon nanosheets, carbon nanorods, and carbon nanobelts.

5. The air electrode of claim 1, wherein the carbonaceous material is porous.

6. The air electrode of claim 1, wherein an $I_D/I_G$ ratio of D band to G band in a Raman spectrum of the carbonaceous material is greater than 1.10.

7. The air electrode of claim 1, wherein the electrolyte comprises at least one of an ion-conductive polymer, an ionic liquid, and an organic liquid electrolyte.

8. The air electrode of claim 7, wherein the ion-conductive polymer comprises at least one of polyethylene oxide, polyvinyl alcohol, and polyvinylpyrrolidone.

9. The air electrode of claim 7, wherein the ionic liquid comprises at least one of diethyl methyl ammonium trifluoromethane sulfonate, dimethyl propyl ammonium trifluoromethanesulfonate, diethyl methyl ammonium trifluoromethane sulfonylimide, and methyl propyl piperidinium trifluoromethane sulfonylimide.

10. The air electrode of claim 1, wherein the electrolyte is a solid electrolyte.

11. The air electrode of claim 10, wherein the electrolyte is a polymer electrolyte.

12. The air electrode of claim 1, wherein the electrolyte is a solvent-free electrolyte.

13. The air electrode of claim 1, wherein the lithium salt comprises at least one of LiTFSI, LiPF$_6$, LiBF$_4$, LiAsF$_6$, LiClO$_4$, and LiNO$_3$.

14. A lithium air battery comprising:
    a negative electrode that allows incorporation and deincorporation of lithium ions;
    the air electrode of claim 1; and
    a separator disposed between the negative electrode and the air electrode.

15. A method of manufacturing an air electrode, the method comprising:
    contacting a starting carbonaceous material with a proton-dissociative functional group-containing compound to obtain a carbonaceous material comprising a plurality of proton-dissociative functional groups; and
    treating the carbonaceous material comprising the plurality of proton-dissociative functional groups with a neutralizing agent to obtain a carbonaceous material having an ion-dissociative functional group represented by one of Formula 1 to 3:

—R$_1$—SO$_3$M          Formula 1

—R$_2$—SO$_2$—NM$_2$          Formula 2

—R$_3$—SO$_2$—N(M)-SO$_2$—R$_4$          Formula 3 wherein, in Formulas 1, 2, and 3,
    M is lithium,
    R$_1$, R$_2$, and R$_3$ are each independently a covalent bond, a halogen-substituted or unsubstituted C1-C10 alkylene group, a halogen-substituted or unsubstituted C6-C20 arylene group, or a halogen-substituted or unsubstituted C3-C20 heteroarylene group, and
    R$_4$ is a halogen-substituted or unsubstituted C1-C10 alkyl group, a halogen-substituted or unsubstituted C6-C20 aryl group, or a halogen-substituted or unsubstituted C3-C20 heteroaryl group.

16. The method of claim 15, wherein the starting carbonaceous material comprises at least one of carbon nanoparticles, carbon nanotubes, carbon nanofibers, carbon nanosheets, carbon nanorods, and carbon nanobelts.

17. The method of claim 15, wherein the proton-dissociative functional group-containing compound comprises at least one of 4-aminobenzenesulfonic acid and chlorosulfuric acid.

18. The method of claim 15, wherein the neutralizing agent comprises at least one of LiOH, $LiClO_4$, and LiCl.

19. The method of claim 15, wherein the method comprises:
contacting a starting carbonaceous material with a proton-dissociative functional group-containing compound to obtain a carbonaceous material having a plurality of proton-dissociative functional groups coated on a surface thereof; and
treating the carbonaceous material having the plurality of proton-dissociative functional groups coated on the surface thereof with a neutralizing agent to obtain a carbonaceous material having an ion-dissociative functional group coated on the surface thereof and represented by one of Formulas 1 to 3.

\* \* \* \* \*